(12) United States Patent
Griffin

(10) Patent No.: US 7,367,014 B2
(45) Date of Patent: Apr. 29, 2008

(54) SYSTEM AND METHOD FOR XML DATA REPRESENTATION OF PORTLETS

(75) Inventor: Philip B. Griffin, Longmont, CO (US)

(73) Assignee: BEA Systems, Inc., San Jose, CA (US)

( * ) Notice: Subject to any disclaimer, the term of this patent is extended or adjusted under 35 U.S.C. 154(b) by 577 days.

(21) Appl. No.: 10/279,449

(22) Filed: Oct. 24, 2002

(65) Prior Publication Data

US 2003/0126558 A1    Jul. 3, 2003

Related U.S. Application Data

(60) Provisional application No. 60/386,487, filed on Oct. 24, 2001.

(51) Int. Cl.
*G06F 9/44* (2006.01)
(52) U.S. Cl. ...................... 717/107; 717/121
(58) Field of Classification Search ................ 717/107; 715/500, 513; 707/3
See application file for complete search history.

(56) References Cited

U.S. PATENT DOCUMENTS

| | | | |
|---|---|---|---|
| 5,173,939 A | 12/1992 | Abadi et al. .................. 707/9 |
| 5,237,614 A | 8/1993 | Weiss | |
| 5,335,345 A | 8/1994 | Frieder et al. | |
| 5,347,653 A | 9/1994 | Flynn et al. | |
| 5,355,474 A | 10/1994 | Thuraisingham et al. | |
| 5,369,702 A | 11/1994 | Shanton ...................... 713/166 |
| 5,426,747 A | 6/1995 | Weinreb et al. | |
| 5,481,700 A | 1/1996 | Thuraisingham ............... 707/9 |
| 5,544,322 A | 8/1996 | Cheng et al. | |
| 5,551,040 A | 8/1996 | Blewett | |
| 5,557,747 A | 9/1996 | Rogers et al. | |
| 5,577,209 A | 11/1996 | Boyle et al. | |
| 5,627,886 A | 5/1997 | Bowman .................... 379/111 |
| 5,649,195 A | 7/1997 | Scott et al. | |
| 5,757,669 A | 5/1998 | Christie et al. | |
| 5,758,355 A | 5/1998 | Buchanan | |
| 5,797,128 A | 8/1998 | Birnbaum ...................... 707/5 |
| 5,825,883 A | 10/1998 | Archibald et al. | |
| 5,826,000 A | 10/1998 | Hamilton | |
| 5,826,268 A | 10/1998 | Schaefer et al. ............... 707/9 |
| 5,838,909 A | 11/1998 | Roy et al. | |
| 5,848,396 A | 12/1998 | Gerace ........................ 705/10 |

(Continued)

FOREIGN PATENT DOCUMENTS

EP    1 256 889 A2    11/2002

(Continued)

OTHER PUBLICATIONS

Hunter, Jason, "Java Servlet Programming", second edition, O'Reilly, Apr. 11, 2001.*

(Continued)

*Primary Examiner*—Wei Zhen
*Assistant Examiner*—Chih-Ching Chow
(74) *Attorney, Agent, or Firm*—Fliesler Meyer LLP

(57) ABSTRACT

An Extensible Markup Language (XML) document adapted to describe a portlet, comprising a name element including a name tag, a description element including a description tag, and a content resource element including a content tag.

25 Claims, 7 Drawing Sheets

U.S. PATENT DOCUMENTS

| | | |
|---|---|---|
| 5,867,667 A | 2/1999 | Butman et al. |
| 5,872,928 A | 2/1999 | Lewis et al. |
| 5,889,953 A | 3/1999 | Thebaut et al. |
| 5,918,210 A | 6/1999 | Rosenthal et al. |
| 5,925,126 A | 7/1999 | Hsieh |
| 5,941,947 A | 8/1999 | Brown et al. |
| 5,950,195 A | 9/1999 | Stockwell et al. |
| 5,954,798 A | 9/1999 | Shelton et al. |
| 5,956,400 A | 9/1999 | Chaum et al. |
| 5,956,719 A | 9/1999 | Kudo et al. |
| 5,966,707 A | 10/1999 | Van Huben et al. |
| 5,983,227 A | 11/1999 | Nazem et al. |
| 5,987,469 A | 11/1999 | Lewis et al. |
| 5,987,611 A | 11/1999 | Freund |
| 5,991,735 A | 11/1999 | Gerace |
| 5,991,877 A | 11/1999 | Luckenbaugh ............. 726/1 |
| 5,991,879 A | 11/1999 | Still |
| 6,005,571 A | 12/1999 | Pachauri .................. 715/764 |
| 6,006,194 A | 12/1999 | Merel et al. |
| 6,006,265 A | 12/1999 | Rangan et al. |
| 6,009,410 A | 12/1999 | Lemole et al. |
| 6,026,433 A | 2/2000 | D'Arlach et al. |
| 6,029,144 A | 2/2000 | Barrett et al. |
| 6,029,182 A | 2/2000 | Nehab et al. ............. 715/523 |
| 6,029,196 A | 2/2000 | Lenz |
| 6,054,910 A | 4/2000 | Tada et al. |
| 6,055,515 A | 4/2000 | Consentino et al. |
| 6,055,636 A | 4/2000 | Hillier et al. |
| 6,055,637 A | 4/2000 | Hudson et al. |
| 6,058,392 A | 5/2000 | Sampson et al. |
| 6,070,244 A | 5/2000 | Orchier et al. |
| 6,073,242 A | 6/2000 | Hardy et al. |
| 6,081,829 A | 6/2000 | Sidana |
| 6,083,276 A * | 7/2000 | Davidson et al. ......... 717/107 |
| 6,088,451 A | 7/2000 | He et al. |
| 6,088,679 A | 7/2000 | Barkley |
| 6,092,083 A | 7/2000 | Brodersen et al. |
| 6,098,173 A | 8/2000 | Elgressy et al. |
| 6,105,027 A | 8/2000 | Schneider et al. |
| 6,108,687 A | 8/2000 | Craig |
| 6,112,192 A | 8/2000 | Capek |
| 6,122,647 A * | 9/2000 | Horowitz et al. ......... 715/513 |
| 6,128,663 A | 10/2000 | Thomas |
| 6,133,915 A | 10/2000 | Arcuri et al. |
| 6,141,010 A | 10/2000 | Hoyle ...................... 715/854 |
| 6,141,686 A | 10/2000 | Jackowski et al. |
| 6,148,311 A | 11/2000 | Wishnie et al. |
| 6,148,333 A | 11/2000 | Guedalia et al. |
| 6,154,844 A | 11/2000 | Touboul et al. |
| 6,157,924 A | 12/2000 | Austin ....................... 707/10 |
| 6,158,010 A | 12/2000 | Moriconi et al. |
| 6,161,139 A | 12/2000 | Win et al. |
| 6,167,407 A | 12/2000 | Nachenberg et al. |
| 6,167,445 A | 12/2000 | Gai et al. |
| 6,167,448 A | 12/2000 | Hemphill et al. |
| 6,169,794 B1 | 1/2001 | Oshimi et al. |
| 6,170,009 B1 | 1/2001 | Mandal et al. |
| 6,178,172 B1 | 1/2001 | Rochberger |
| 6,182,142 B1 | 1/2001 | Win et al. |
| 6,182,226 B1 | 1/2001 | Reid et al. ................ 713/201 |
| 6,182,277 B1 | 1/2001 | Degroot et al. |
| 6,185,587 B1 | 2/2001 | Bernardo et al. |
| 6,188,399 B1 | 2/2001 | Voas et al. |
| 6,191,786 B1 | 2/2001 | Eyzaguirre et al. |
| 6,195,696 B1 | 2/2001 | Baber et al. |
| 6,202,066 B1 | 3/2001 | Barkley et al. |
| 6,202,157 B1 | 3/2001 | Brownlie et al. |
| 6,202,207 B1 | 3/2001 | Donohue |
| 6,205,466 B1 | 3/2001 | Karp et al. |
| 6,209,101 B1 | 3/2001 | Mitchem et al. |
| 6,216,231 B1 | 4/2001 | Stubblebine et al. |
| 6,226,745 B1 | 5/2001 | Wiederhold ............... 713/200 |
| 6,230,271 B1 | 5/2001 | Wadlow et al. |
| 6,233,576 B1 | 5/2001 | Lewis |
| 6,233,686 B1 | 5/2001 | Zenchelsky et al. |
| 6,236,991 B1 | 5/2001 | Frauenhofer et al. |
| 6,241,608 B1 | 6/2001 | Torango .................... 463/27 |
| 6,243,747 B1 | 6/2001 | Lewis et al. |
| 6,253,321 B1 | 6/2001 | Nikander et al. |
| 6,256,741 B1 | 7/2001 | Stubblebine |
| 6,260,050 B1 | 7/2001 | Yost et al. ............... 715/501.1 |
| 6,269,393 B1 | 7/2001 | Yost et al. ................ 709/201 |
| 6,269,456 B1 | 7/2001 | Hodges et al. |
| 6,275,941 B1 | 8/2001 | Saito et al. |
| 6,285,366 B1 | 9/2001 | Ng et al. |
| 6,285,983 B1 | 9/2001 | Jenkins |
| 6,285,985 B1 | 9/2001 | Horstmann ................ 705/14 |
| 6,292,900 B1 | 9/2001 | Ngo et al. |
| 6,295,607 B1 | 9/2001 | Johnson |
| 6,301,613 B1 | 10/2001 | Ahlstrom et al. |
| 6,304,881 B1 | 10/2001 | Halim et al. |
| 6,308,163 B1 | 10/2001 | Du et al. ...................... 705/8 |
| 6,317,868 B1 | 11/2001 | Grimm et al. |
| 6,321,336 B1 | 11/2001 | Applegate et al. |
| 6,327,594 B1 | 12/2001 | Van Huben et al. |
| 6,327,628 B1 * | 12/2001 | Anuff et al. ................ 719/311 |
| 6,336,073 B1 | 1/2002 | Ihara et al. |
| 6,339,423 B1 | 1/2002 | Sampson et al. |
| 6,339,826 B2 | 1/2002 | Hayes et al. |
| 6,341,352 B1 | 1/2002 | Child et al. |
| 6,353,886 B1 | 3/2002 | Howard et al. |
| 6,360,363 B1 | 3/2002 | Moser et al. |
| 6,377,973 B2 | 4/2002 | Gideon |
| 6,381,579 B1 | 4/2002 | Gervais et al. |
| 6,385,627 B1 | 5/2002 | Cragun |
| 6,393,474 B1 | 5/2002 | Eichert et al. |
| 6,397,222 B1 | 5/2002 | Zellweger |
| 6,397,231 B1 | 5/2002 | Salisbury et al. |
| 6,408,336 B1 | 6/2002 | Schneider et al. |
| 6,412,070 B1 | 6/2002 | Van Dyke et al. |
| 6,412,077 B1 | 6/2002 | Roden et al. |
| 6,418,448 B1 | 7/2002 | Sarkar |
| 6,430,556 B1 | 8/2002 | Goldberg et al. |
| 6,438,563 B1 | 8/2002 | Kawagoe |
| 6,449,638 B1 | 9/2002 | Wecker et al. |
| 6,453,353 B1 | 9/2002 | Win et al. |
| 6,457,007 B1 | 9/2002 | Kikuchi et al. |
| 6,460,084 B1 | 10/2002 | Van Horne et al. |
| 6,460,141 B1 | 10/2002 | Olden |
| 6,463,440 B1 | 10/2002 | Hind et al. |
| 6,463,470 B1 | 10/2002 | Mohaban et al. |
| 6,466,239 B2 | 10/2002 | Ishikawa |
| 6,466,932 B1 | 10/2002 | Dennis et al. |
| 6,473,791 B1 | 10/2002 | Al-Ghosein et al. |
| 6,477,543 B1 | 11/2002 | Huang et al. |
| 6,477,575 B1 | 11/2002 | Koeppel et al. |
| 6,484,177 B1 | 11/2002 | Van Huben et al. |
| 6,484,261 B1 | 11/2002 | Wiegel |
| 6,487,594 B1 | 11/2002 | Bahlmann |
| 6,510,513 B1 | 1/2003 | Danieli |
| 6,519,647 B1 | 2/2003 | Howard et al. |
| 6,530,024 B1 | 3/2003 | Proctor |
| 6,539,375 B2 | 3/2003 | Kawasaki .................... 707/5 |
| 6,542,993 B1 | 4/2003 | Erfani |
| 6,553,498 B1 | 4/2003 | Elgressy et al. |
| 6,571,247 B1 | 5/2003 | Danno et al. ............. 707/100 |
| 6,574,736 B1 | 6/2003 | Andrews |
| 6,581,054 B1 | 6/2003 | Bogrett |
| 6,581,071 B1 | 6/2003 | Gustman et al. |
| 6,584,454 B1 | 6/2003 | Hummel et al. |
| 6,587,849 B1 | 7/2003 | Mason et al. ................ 707/5 |
| 6,587,876 B1 | 7/2003 | Mahon et al. |
| 6,606,708 B1 | 8/2003 | Devine et al. |
| 6,615,218 B2 | 9/2003 | Mandal et al. |

| | | |
|---|---|---|
| 6,618,806 B1 | 9/2003 | Brown et al. |
| 6,633,538 B1 | 10/2003 | Tanaka et al. |
| 6,654,747 B1 | 11/2003 | Van Huben et al. |
| 6,665,677 B1 | 12/2003 | Wotring et al. |
| 6,668,354 B1* | 12/2003 | Chen et al. .................. 715/517 |
| 6,684,227 B2 | 1/2004 | Duxbury |
| 6,684,369 B1 | 1/2004 | Bernardo et al. |
| 6,697,805 B1 | 2/2004 | Choquier et al. |
| 6,718,380 B1 | 4/2004 | Mohaban et al. |
| 6,721,888 B1 | 4/2004 | Liu et al. |
| 6,732,144 B1 | 5/2004 | Kizu et al. |
| 6,735,586 B2* | 5/2004 | Timmons ....................... 707/3 |
| 6,735,701 B1 | 5/2004 | Jacobson |
| 6,738,789 B2 | 5/2004 | Multer et al. ................ 707/201 |
| 6,751,659 B1 | 6/2004 | Fenger et al. |
| 6,754,672 B1 | 6/2004 | McLauchlin ............. 707/104.1 |
| 6,757,698 B2 | 6/2004 | McBride et al. |
| 6,757,822 B1 | 6/2004 | Feiertag et al. |
| 6,769,095 B1 | 7/2004 | Brassard et al. |
| 6,769,118 B2 | 7/2004 | Garrison et al. |
| 6,772,332 B1 | 8/2004 | Boebert et al. |
| 6,779,002 B1 | 8/2004 | Mwaura .................... 707/203 |
| 6,785,728 B1 | 8/2004 | Schneider et al. |
| 6,789,202 B1 | 9/2004 | Ko et al. |
| 6,832,263 B2 | 12/2004 | Polizzi et al. |
| 6,832,313 B1 | 12/2004 | Parker |
| 6,834,284 B2 | 12/2004 | Acker et al. |
| 6,854,035 B2 | 2/2005 | Dunham et al. |
| 6,856,999 B2 | 2/2005 | Flanagin et al. |
| 6,857,012 B2 | 2/2005 | Sim et al. |
| 6,865,549 B1 | 3/2005 | Connor |
| 6,873,988 B2 | 3/2005 | Herrman et al. |
| 6,880,005 B1 | 4/2005 | Bell et al. |
| 6,889,222 B1 | 5/2005 | Zhao |
| 6,901,403 B1* | 5/2005 | Bata et al. .................. 707/101 |
| 6,904,454 B2 | 6/2005 | Stickler |
| 6,912,538 B2 | 6/2005 | Stapel et al. |
| 6,912,691 B1* | 6/2005 | Dodrill et al. ............... 715/513 |
| 6,920,457 B2 | 7/2005 | Pressmar |
| 6,922,695 B2 | 7/2005 | Skufca et al. ................. 707/10 |
| 6,931,549 B1 | 8/2005 | Ananda |
| 6,934,934 B1 | 8/2005 | Osborne et al. ............ 717/126 |
| 6,954,751 B2* | 10/2005 | Christfort et al. .............. 707/6 |
| 6,957,261 B2 | 10/2005 | Lortz |
| 6,961,897 B1 | 11/2005 | Peel et al. |
| 6,965,999 B2 | 11/2005 | Fox et al. |
| 6,970,876 B2 | 11/2005 | Hotti et al. |
| 6,978,379 B1 | 12/2005 | Goh et al. |
| 6,985,915 B2 | 1/2006 | Somalwar et al. |
| 6,987,580 B2 | 1/2006 | Watanabe et al. |
| 6,988,138 B1 | 1/2006 | Alcorn et al. |
| 7,003,578 B2 | 2/2006 | Kanada et al. |
| 7,013,485 B2 | 3/2006 | Brown et al. |
| 7,035,944 B2 | 4/2006 | Fletcher et al. |
| 7,047,522 B1 | 5/2006 | Dixon et al. |
| 7,051,316 B2 | 5/2006 | Charisius et al. |
| 7,062,490 B2 | 6/2006 | Adya et al. |
| 7,076,652 B2 | 7/2006 | Ginter et al. |
| 7,080,000 B1 | 7/2006 | Cambridge |
| 7,085,994 B2 | 8/2006 | Gvily |
| 7,089,584 B1 | 8/2006 | Sharma |
| 7,093,200 B2 | 8/2006 | Schreiber et al. |
| 7,093,261 B1 | 8/2006 | Harper et al. |
| 7,096,224 B2 | 8/2006 | Murthy et al. |
| 7,124,192 B2 | 10/2006 | High et al. |
| 7,124,413 B1 | 10/2006 | Klemm et al. |
| 7,143,151 B1 | 11/2006 | Kayashima et al. |
| 7,174,563 B1 | 2/2007 | Brownlie et al. |
| 7,185,192 B1 | 2/2007 | Kahn |
| 7,272,625 B1 | 9/2007 | Hannel et al. |
| 2001/0009016 A1 | 7/2001 | Hofmann et al. |
| 2001/0032128 A1 | 10/2001 | Kepecs |
| 2001/0034771 A1 | 10/2001 | Hutsch et al. |
| 2001/0039586 A1 | 11/2001 | Primak et al. |
| 2002/0019827 A1 | 2/2002 | Shiman et al. |
| 2002/0024536 A1* | 2/2002 | Kahan et al. ................ 345/745 |
| 2002/0029296 A1 | 3/2002 | Anuff et al. |
| 2002/0046099 A1 | 4/2002 | Frengut et al. |
| 2002/0049815 A1 | 4/2002 | Dattatri |
| 2002/0059394 A1 | 5/2002 | Sanders |
| 2002/0062451 A1 | 5/2002 | Scheidt et al. |
| 2002/0067370 A1 | 6/2002 | Forney et al. |
| 2002/0069261 A1 | 6/2002 | Bellare et al. ............... 709/218 |
| 2002/0095332 A1 | 7/2002 | Doherty et al. |
| 2002/0103818 A1* | 8/2002 | Amberden .................. 707/205 |
| 2002/0107913 A1 | 8/2002 | Rivera et al. ............... 709/203 |
| 2002/0107920 A1 | 8/2002 | Hotti |
| 2002/0111998 A1 | 8/2002 | Kim |
| 2002/0120685 A1 | 8/2002 | Srivastava et al. |
| 2002/0124053 A1 | 9/2002 | Adams et al. |
| 2002/0135617 A1 | 9/2002 | Samid |
| 2002/0143819 A1 | 10/2002 | Han et al. |
| 2002/0147645 A1 | 10/2002 | Alao et al. |
| 2002/0152267 A1 | 10/2002 | Lennon |
| 2002/0152279 A1 | 10/2002 | Sollenberger et al. |
| 2002/0161903 A1* | 10/2002 | Besaw ....................... 709/229 |
| 2002/0169893 A1 | 11/2002 | Chen et al. |
| 2002/0173971 A1 | 11/2002 | Stirpe et al. .................... 705/1 |
| 2002/0178119 A1 | 11/2002 | Griffin et al. |
| 2002/0188869 A1 | 12/2002 | Patrick |
| 2002/0194267 A1 | 12/2002 | Flesner et al. |
| 2003/0014442 A1* | 1/2003 | Shiigi et al. ................. 707/513 |
| 2003/0032409 A1 | 2/2003 | Hutcheson et al. |
| 2003/0065721 A1 | 4/2003 | Roskind |
| 2003/0069874 A1 | 4/2003 | Hertzog |
| 2003/0078959 A1 | 4/2003 | Yeung et al. |
| 2003/0078972 A1 | 4/2003 | Tapissier et al. |
| 2003/0110448 A1* | 6/2003 | Haut et al. ................... 715/513 |
| 2003/0131113 A1 | 7/2003 | Reeves et al. .............. 709/229 |
| 2003/0146937 A1 | 8/2003 | Lee |
| 2003/0167455 A1 | 9/2003 | Iborra et al. |
| 2003/0187956 A1 | 10/2003 | Belt et al. |
| 2003/0204481 A1 | 10/2003 | Lau |
| 2003/0212766 A1 | 11/2003 | Giles et al. |
| 2003/0229623 A1 | 12/2003 | Chang et al. ................... 707/3 |
| 2004/0003071 A1 | 1/2004 | Mathew et al. |
| 2004/0015476 A1* | 1/2004 | Twaddle ........................ 707/1 |
| 2004/0019650 A1 | 1/2004 | Auvenshine |
| 2004/0024812 A1 | 2/2004 | Park et al. |
| 2004/0030744 A1 | 2/2004 | Rubin et al. |
| 2004/0205473 A1* | 10/2004 | Fisher et al. ................. 715/500 |
| 2004/0205557 A1* | 10/2004 | Bahrs et al. ................. 715/513 |
| 2004/0230546 A1 | 11/2004 | Rogers |
| 2005/0097008 A1 | 5/2005 | Ehring et al. |
| 2006/0059107 A1 | 3/2006 | Elmore et al. |
| 2006/0122882 A1 | 6/2006 | Brown et al. |
| 2006/0167858 A1 | 7/2006 | Dennis et al. |

FOREIGN PATENT DOCUMENTS

| | | |
|---|---|---|
| WO | WO 00/38078 | 6/2000 |
| WO | WO 01/14962 | 3/2001 |
| WO | 01/67285 A2 | 9/2001 |
| WO | WO 01/77823 A1 | 10/2001 |
| WO | WO 02/063496 A2 | 8/2002 |

OTHER PUBLICATIONS

U.S. Appl. No. 10/279,450, filed Oct. 24, 2002, Daniel Selman et al.
U.S. Appl. No. 10/279,542, filed Oct. 24, 2002, Thomas A. Cook et al.
U.S. Appl. No. 10/279,543, filed Oct. 24, 2002, Philip B. Griffin et al.
U.S. Appl. No. 10/279,564, filed Oct. 24, 2002, Philip B. Griffin et al.
U.S. Appl. No. 10/279,663, filed Oct. 24, 2002, John Haut et al.
U.S. Appl. No. 10/279,696, filed Oct. 24, 2002, Shelly Qian et al.

U.S. Appl. No. 10/279,951, filed Oct. 24, 2002, Chris Jolley et al.
Moran, D.B., et al. "Multimodal User Interfaces in the Open Agent Architecture,"*ACM 0-89791-839-8/96/01, IUI 97*, Orlando Florida USA (1997) pp. 61-68.
Rouff, C., "Formal Specification of User Interfaces," *SIGCHI Bulletin* vol. 28, No. 3 (Jul. 1996) pp. 27-33.
"Guide to Using the BEA E-Business Control Center," *BEA WebLogic Portal*, Version 4.0 (Oct. 2001) 356 pages.
International Search Report, PCT/US02/34048, Dec. 23, 2002, 2 sheets.
International Search Report, PCT/US02/34008, Dec. 31, 2002, 5 sheets.
International Search Report, PCT/US02/34006, Jan. 13, 2003, 3 sheets.
International Search Report, PCT/US02/34007, Jan. 21, 2003, 3 sheets.
International Search Report, PCT/US02/34089, Feb. 10, 2003, 4 sheets.
International Search Report, PCT/US02/34309, Feb. 14, 2003, 4 sheets.
International Search Report, PCT/US02/34308, Mar. 5, 2003, 4 sheets.
International Search Report, PCT/US02/34088, Mar. 7, 2003, 3 sheets.
Sundsted, Todd, "JNDI Overview, Part 1: An Introduction to Naming Sevices", JavaWorld, Jan. 2000. pp. 1-6, (downloaded from: www.javaworld.com/javaworld/jw-01-2000/jw-01-howto_p.html. ).
Moore, Bill, et al., "Migrating Weblogic Applications to WebSphere Advanced Edition", IBM Redbooks, Jan. 2001, pp. 1, 3-4, 109-111 and 181-195.
Barrett, Alexandra, "Trying Out Transactions", SunExpert Magazine, Jan. 1999, pp. 57-59.
Ayers, Danny, et al., Professional Java Server Programming, Wrox Press, Ltd., Birmingham, UK, Dec. 1999, pp. 515-545.
Ford, Nigel, Web Developer.com Guide to Building Intelligent Web Sites with JavaScript, Wiley Computer Publishing, NY, NY © 1998, pp. 65-86, 96-98, 101-102, 245-250 and 324-327.
Microsoft Computer Dictionary, 4th Edition, Microsoft Press, Redmond, WA,© 1999, p. 489.
Eiji Okamoto, "Proposal for Integrated Security Systems", Jun. 1992, IEEE Computer Society Press, pp. 354-358.
http://java.sun.com/products/ejb/ (last visit: Dec. 7, 2004).
http://www.javaworld.com/jw-12-2002/jw-1207-yesnoejb_p.htlm (last visit: Dec. 7, 2004).
International Search Report for PCT/US04/04078, dated Nov. 18, 2005 (2 pages).
International Search Report for PCT/US04/04140, dated Feb. 17, 2005 (2 pages).
Written Opinion for PCT/US04/04078, dated Nov. 18, 2005 (4 pages).
Written Opinion for PCT/US04/04140, dated Dec. 12, 2005 (5 pages).
USDataCenters . . . . eBusiness, Business Wire, p. 2079. Apr. 4, 2001.
Beck, M., et al., "Enabling Full Service Surrogates Using the Portable Channel Representation", Proceedings of the Tenth International Conference on World Wide Web, Apr. 2001, pp. 376-385.
European Search Report dated Jun. 7, 2006 (3 pages).
Adomavicius, Gediminas, et al., "User Profiling in Personalization Applications Through Rule Discovery and Validation," KDD '99, San Diego, CA, US, ACM, pp. 377-381 (1999).
Adya, Atul, et al., "Farsite: Federated, Available, and Reliable, and Reliable Storage for an Incompletely Trusted Environment," ACM SIGOPS Operating System Review, vol. 36, Issue SI(Winter 2002), OSDI '02, Proceedings of the 5th Symposium on Operating Systems Design and Implementation, pp. 1-14.
Atkins, David L., et al., "MAWL: A Domain Specific Language for Form-Based Services," IEEE Transactions on Software Engineering, IEEE Service Center, Los Alamitos, CA, US, vol. 25, No. 3, pp. 334-346 (May 1999).
Browne, Shirley, et al. "Location-Independent Naming for Virtual Distributed Software Repositories,"ACM Symposium on Software Reusability, Seattle, WA, US, vol. 20, Issue SI, pp. 179-185 (Aug. 1995).
Candan, K.S., et al. "Enabling Dynamic Content Caching for Database-Driven Websites," Proceedings of the 2001 ACM SIGMOD International Conference on Management of Data, Santa Barbara, CA, US, pp. 532-543 (2001).
Cately, Christina, et al. "Design of a Health Care Architecture for Medical Data Interoperability and Application Integration," Proceedings of the Second Joint EMBS/BMES Conference, Houston, TX, US, Oct. 23-26, 2002, IEEE, vol. 3, pp. 1952-1953.
Cingil, Ibrahim, et al., "A Broader Approach to Personalization," Communications of the ACM, vol. 43, No. 6, pp. 136-141 (Aug. 2000).
Freudenthal, Eric, et al., "dRBAC: Distributed Role-Based Access Control for Dynamic Coalition Environments," Proceedings of the 22nd International Conference on Distributed Computing Systems (ICDCS '02) IEEE 2002, 10 pages.
Howes, T., "The String Representation of LDAP Search Filters," © The Internet Society, RFC 2254, 8 pages (Dec. 1997).
Kistler, Thomas, et al., "WebL—a Programming Language for the Web," Computer Networks and ISDN Systems, North Holland Publishing, Amsterdam, NL, vol. 30, No. 1-7, pp. 259-270 (Apr. 1998).
Levy, Michael R., "Web Programming in Guide," Software Practice & Experience, Wiley & Sons, Bognor Regis, GB, vol. 28, No. 15, Dec. 25, 1998, pp. 1581-1603.
Supplementary European Search Report for EP 01 97 5484 dated Dec. 19, 2006 (2 pages).
Stephanidis, Constantine, et al., "Decision Making in Intelligent User Interfaces," IUI'97, Orlando, FL, US, ACM, pp. 195-202 (1997).
Stiemerling, Oliver, et al., "How to Make Software Softer—Designing Tailorable Applications," DIS '97, Amsterdam, The Netherlands, ACM, pp. 365-376 (1997).
Zhang, Zheng, et al., "Designing a Robust Namespace for Distributed File Services," Reliable Distributed System, Proceedings 20th IEEE Symposium on Oct. 28-31, 2001, pp. 162-171.
Symborski, C. W., "Updating software and configuration data in a distributed communications network", Computer Networking Symposium, 1988, pp. 331-338.
European Search Report for EP 02 77 3915 dated Oct. 5, 2006 (3 pages).
"Method and System for Visually Constructing Document Type Definitions and Related Artifacts Using a Reusable Object Model," IBM Technical Disclosures Bulletin, May 23, 2001, 3 pages.
Bertino, Elisa, et al., "TRBAC: A Temporal Role-Based Access Control Model," ACM Transactions on Information and System Security (TISSEC), vol. 4, Issue 3, pp. 191-223 (Aug. 2001).
Covington, Michael J., et al., "Securing Context-Aware Applications Using Environment Roles," ACM Workshop on Role Based Access Control, Proceedings of the Sixth ACM Symposium on Access Control Models and Technolgies, pp. 10-20 (2001).
Georgiadis, Christos K., et al. "Flexible Team-Based Access Control Using Contexts," ACM Workshop on Role Based Access Control, Proceedings of the Sixth ACM Symposium on Access Control Methods and Technologies, pp. 21-27 (2001).
Goh, Chen, et al., "Towards a more Complete Model of Role," Symposium on Access Control Models and Technologies, Proceedings of the Third ACM Workshop on Role-Based Access Control, pp. 56-61 (1998).
Hayton, R.J., et al., "Access Control in an Open Distributed Environment," 12 pages (1998).
Lee, Amy J., et al., "Keeping Virtual Information Resources up and Running," IBM Press, pp. 1-14 (Nov. 1997).
Parker, Elisabeth, "The Complete Idiot's Guide® to Microsoft® FrontPage 2000", QUE®, Indianapolis, IN, pp. 7 and 52 (1999).
Rossi, Gustavo, et al., Designing Personalized Web Applications, ACM, WWW 10, Hong Kong, May 1-5, 2001, pp. 275-284.
Sandhu, Ravi S., et al. "Role-Based Access Control Models," IEEE Computer, vol. 29, No. 2, pp. 38-47 (1996).

Tanyi, Emmanuel, "Easy XML," www.winsite.com, pp. 1-6 (Mar. 2000).

Tzelepi, Sofia K., et al., "A Flexible Content and Context-Based Access Control Model for Multimedia Medical Image Database Systems," International Multimedia Conference, Proceedings of the 2001 Workshop on Multimedia and Security, pp. 52-55 (Oct. 5, 2001).

Yao, Walt, et al., "A Model of OASIS Role-Based Access Control and its Support for Active Security," ACM Workshop on Role Based Access Control, Proceedings of the Sixth ACM Symposium on Access Control Methods and Technologies, pp. 171-181 (2001).

Koved, L., et al. "Security Challenges for Enterprise Java in an E-business Environment," IBM Systems Journal, vol. 40, No. 1, pp. 130-152 (Jan. 2001).

Microsoft Windows ("Windows Explorer") copyright 1981-2001, 3 pages.

Apostolopoulos, T.K., et al., "Enforcing Security Policies in Large Scale Communication Networks," 5 pages.

Harris, J. Archer, et al. "The Design and Implementation of a Network Account Management System," 1996 Lisa X, Chicago, IL, Sep. 29-Oct. 4, 1996, pp. 33-42.

Anderson, Paul, "Towards a High-Level Machine Configuration System," 1994 LISA, Sep. 19-23, 1994, San Diego, California, pp. 19-26.

Schwartau, Winn, "Securing the Enterprise," Network World, Jan. 27, 1997, 14, 4, ABI/INFORM Global, p. 42 (1997).

Anand, Rangachari, et al., "A Flexible Security Model for Using Internet Content," IEEE, pp. 89-96 (1997).

Trostle, Jonathan, et al. "A Flexible Distributed Authorization Protocol," IEEE, Proceedings of SNDSS '96, pp. 43-52 (1996).

Casella, Karen A. "Security Administration in an Open Networking Environment," 1995 LISA IX, Monterey, California, Sep. 17-22, 1995, pp. 67-74.

Petrosky, Mary, "Directories in the Limelight," Network World, Mar. 16, 1998, 15, 11, ABI/INFORM Global, pp. 42-46 (1998).

* cited by examiner

```xml
<?xml version="1.0" encoding="UTF-8"?>
<portlet xmlns="http://www.bea.com/servers/portal/xsd/portlet/1.0"
      xmlns:xsi="http://www.w3.org/2000/10/XMLSchema-instance"
xsi:schemaLocation="http://www.bea.com/servers/portal/xsd/portlet/1.0
portlet - 1_0.xsd">
    <portlet-name>Quote</portlet-name>
    <description>A stock quote portlet</description>
    <webflow-filename>mystocks</webflow-filename>
    <content-url>/portlets/quote/quote.jsp</content-url>
    <header-url/>
    <alternate-header-url/>
    <footer-url/>
    <alternate-footer-url/>
    <titlebar-url>/framework/titlebar.jsp</titlebar-url>
    <banner-url/>
    <editable>false</editable>
    <edit-url/>
    <helpable>false</helpable>
    <help-url/>
    <icon-url>/portlets/quote/images/pt_quote.gif</icon-url>
    <minimizable>true</minimizable>
    <maximizable>true</maximizable>
    <maximize-url/>
    <mandatory>false</mandatory>
    <movable>true</movable>
    <floatable>true</floatable>
    <default-minimized>false</default-minimized>
    <login-required>false</login-required>
</portlet>
```

*Figure 6*

```
<xsd:schema
    targetNamespace="http://www.bea.com/servers/portal/xsd/portlet/1.0"
    xmlns="http://www.bea.com/servers/portal/xsd/portlet/1.0"
    xmlns:xsd="http://www.w3.org/2000/10/XMLSchema"
    xmlns:xsi="http://www.w3.org/2000/10/XMLSchema-instance"
    xsi:schemaLocation="http://www.w3.org/2000/10/XMLSchema
                        http://www.w3.org/2000/10/XMLSchema.xsd"
    elementFormDefault="qualified"
    atttributeformDefault="unqualified"
    version= "1.0">

<!- - ##################### ROOT ELEMENT ######################
- ->
    <xsd:element name= "portlet">
        <xsd:compexType>
            <xsd:sequence>
                <xsd:element name="portlet-name" type="string254"/>
                <xsd:element name="description" type="string254"/>
                <xsd:element name="webflow-filename" type="xsd:string"/>
                <xsd:element name="content-url" type="xsd:string"/>
                <xsd:element name="header-url" type="xsd:string"/>
                <xsd:element name="alternate-header-url"
type="xsd:string"/>
                <xsd:element name="footer-url" type="xsd:string"/>
                <xsd:element name="alternate-footer-url"
type="xsd:string"/>
                <xsd:element name="titlebar-url" type="xsd:string"/>
                <xsd:element name="banner-url" type="xsd:string"/>
                <xsd:element name="editable" type="xsd:boolean"/>
                <xsd:element name="edit-url" type="xsd:string"/>
                <xsd:element name="helpable" type="xsd:boolean"/>
                <xsd:element name="help-url" type="xsd:string"/>
                <xsd:element name="icon-url" type="xsd:string"/>
                <xsd:element name="minimizable" type="xsd:boolean"/>
                <xsd:element name="maximizable" type="xsd:boolean"/>
                <xsd:element name="maximize-url" type="xsd:string"/>
                <xsd:element name="mandatory" type="xsd:boolean"/>
                <xsd:element name="movable" type="xsd:boolean"/>
                <xsd:element name="floatable" type="xsd:boolean"/>
                <xsd:element name="default-minimized" type="xsd:boolean"/>
                <xsd:element name="login-required" type="xsd:boolean"/>
            </xsd:sequence>
        </xsd:complexType>
    </xsd:element>

<xsd:simpleType name= "string254">
    <xsd:restriction base= "xsd:string">
        <xsd:maxLength value= "254"/>
    </xsd:restriction>
</xsd:simpleType>

</xsd:schema>
```

*Figure 7*

SYSTEM AND METHOD FOR XML DATA REPRESENTATION OF PORTLETS

CLAIM OF PRIORITY

This application claims priority from ENHANCED PORTALS [FLAGSTAFF RELEASE], U.S. Provisional Application No. 60/386,487, Inventors: Phil Griffin, et al., filed on Oct. 24, 2001, and which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCES

This application is related to the following co-pending applications which are each hereby incorporated by reference in their entirety: SYSTEM AND METHOD FOR PORTAL RENDERING, U.S. application Ser. No. 10/279,696, Inventors: Shelly Qian, et al., filed on Oct. 24, 2002. SYSTEM AND METHOD FOR DELEGATED ADMINISTRATION, U.S. application Ser. No. 10/279,543, Inventors: Philip B. Griffin, et al., filed on Oct. 24, 2002. SYSTEM AND METHOD FOR RULE-BASED ENTITLEMENTS, U.S. application Ser. No. 10/279,564, Inventors: Philip B. Griffin, et al., filed on Oct. 24, 2002. SYSTEM AND METHOD FOR APPLICATION FLOW INTEGRATION IN A PORTAL FRAMEWORK, U.S. application Ser. No. 10/279,951, Inventors: Chris Jolley, et al., filed on Oct. 24, 2002. SYSTEM AND METHOD FOR XML DATA REPRESENTATION OF PORTLETS, U.S. application Ser. No. 10/279,449, Inventor: Philip B. Griffin, filed on Oct. 24, 2002. DATA SYNCHRONIZATION, U.S. application Ser. No. 10/279,450, Inventors: Daniel Selman, et al., filed on Oct. 24, 2002; PORTAL ADMINISTRATION TOOL, U.S. application Ser. No. 10/279,542, Inventors: Thomas A. Cook, et al., filed on Oct. 24, 2002.

FIELD OF THE DISCLOSURE

The present invention disclosure relates to persisting portlet configuration information, and in particular, representing portlet configuration information as an Extensible Markup Language (XML) document.

BACKGROUND

A portal is a point of access to data and applications that provides a unified and personalized view of information and resources. Typically, a portal is implemented as one or more pages on a website. In addition to web content, portals provide the ability to display portlets—self-contained applications or content. A portlet has configuration information associated with it that determines how the portlet's graphical user interface (GUI) is rendered and to what extent a user can interact with the GUI. Generally speaking, such configuration information can be stored in a proprietary database accessible only by a Web server or specialized tools. However, this can limit a user's ability to modify and distribute such data. What is needed is a standard way to represent portlet configuration information so that a portlet can be manipulated and rendered by non propriety tools.

BRIEF DESCRIPTION OF THE DRAWINGS

FIG. 6 is an Extensible Markup Language (XML) portlet document in accordance to one embodiment of the invention.

FIG. 7 is an XML Schema Definition (XSD) in accordance to one embodiment of the invention.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
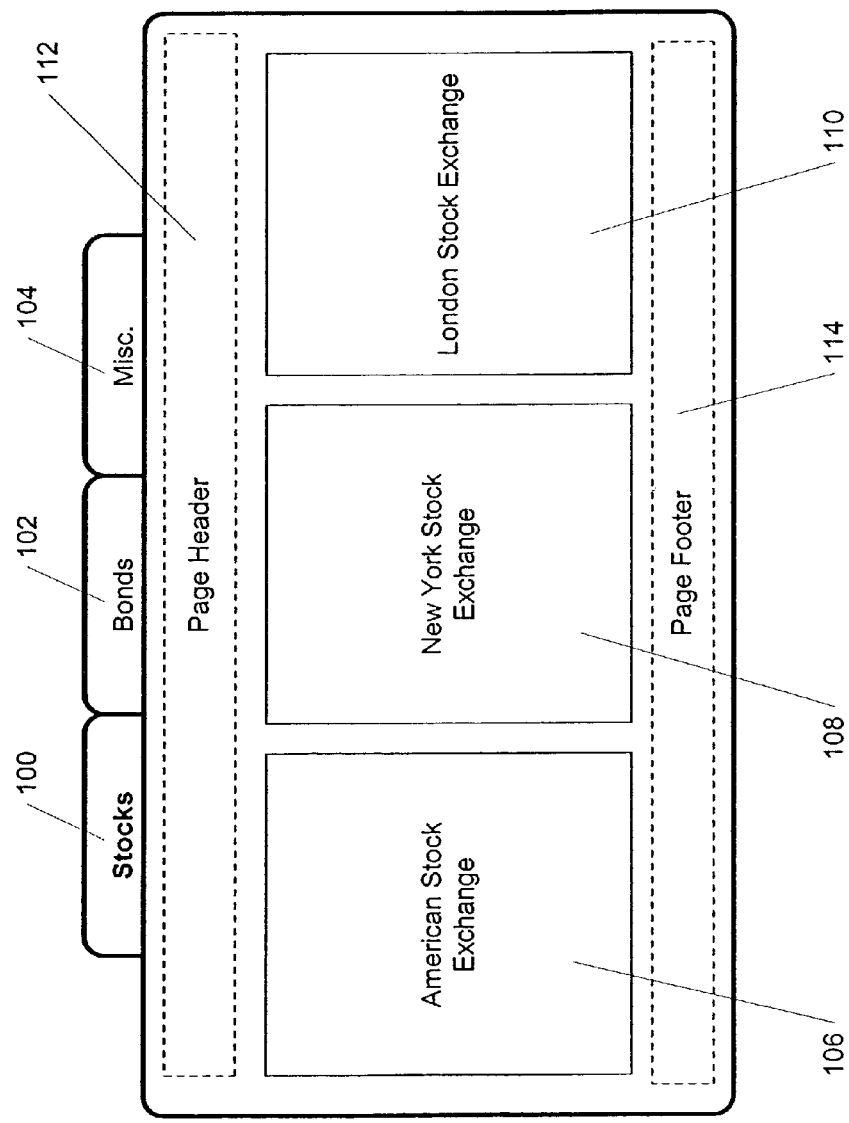
FIG. 1 is an exemplary portal GUI in accordance to one embodiment of the invention.

FIG. 1 is an exemplary portal GUI in accordance to one embodiment. In one embodiment, by way of illustration, a portal can be implemented as one or more pages on a website. Such pages can be implemented using Hypertext Markup Language (HTML), or other programming languages, so as to be render-able by a commercial web browser. One such browser is Microsoft Internet Explorer, available from Microsoft, Corp. of Redmond, Wash. Portal pages can integrate many elements, such as live data feeds, static information and multimedia presentations. Portal page selection tabs 100-104 can each be selected by a user to render a different page within the portal. Portal pages can be thought of as panels or panes that are swapped into and out of a display region of the available portal real estate. If the "stocks" tab 100 were selected, for example, the corresponding portal page would be rendered. By way of a non limiting example, selection of a portal element can be accomplished with an input device such as a mouse, a motion detector, a voice command, a hand or eye gesture, etc. Although tabs 100-104 in FIG. 1 are displayed horizontally, in another embodiment the tabs could be displayed vertically or using some other scheme. In yet another embodiment, tabs 100-104 could be rendered as buttons or as other kinds of interactive controls. A portal page can also include other elements, such as a header 112 and a footer 114 that can serve to provide additional information or act as a unifying graphical element.

A portal page can include portlets. In one embodiment, a portlet is an application that can manage its own GUI within the portal GUI. In one embodiment, a portlet is implemented as a JavaServer Page™ (JSP). JSP's are part of the Java™ standard available from Sun Microsystems, Inc. of Santa Clara, Calif. In FIG. 1, by way of a non limiting example, there are three portlets: American Stock Exchange 106, New York Stock Exchange 108 and London Stock Exchange 110.

Each portlet could display information such as stock prices updated in real time for each exchange. A user might be able to configure such portlets to display only stocks of interest. In another embodiment, the user could select a given stock displayed in portlet 106, 108 or 110 and receive more detailed information, such as the price history, price to earnings ratio, etc. Likewise, selection of the "bonds" tab 102 could render a bonds page having portlets for displaying bond information.

Figure 2:
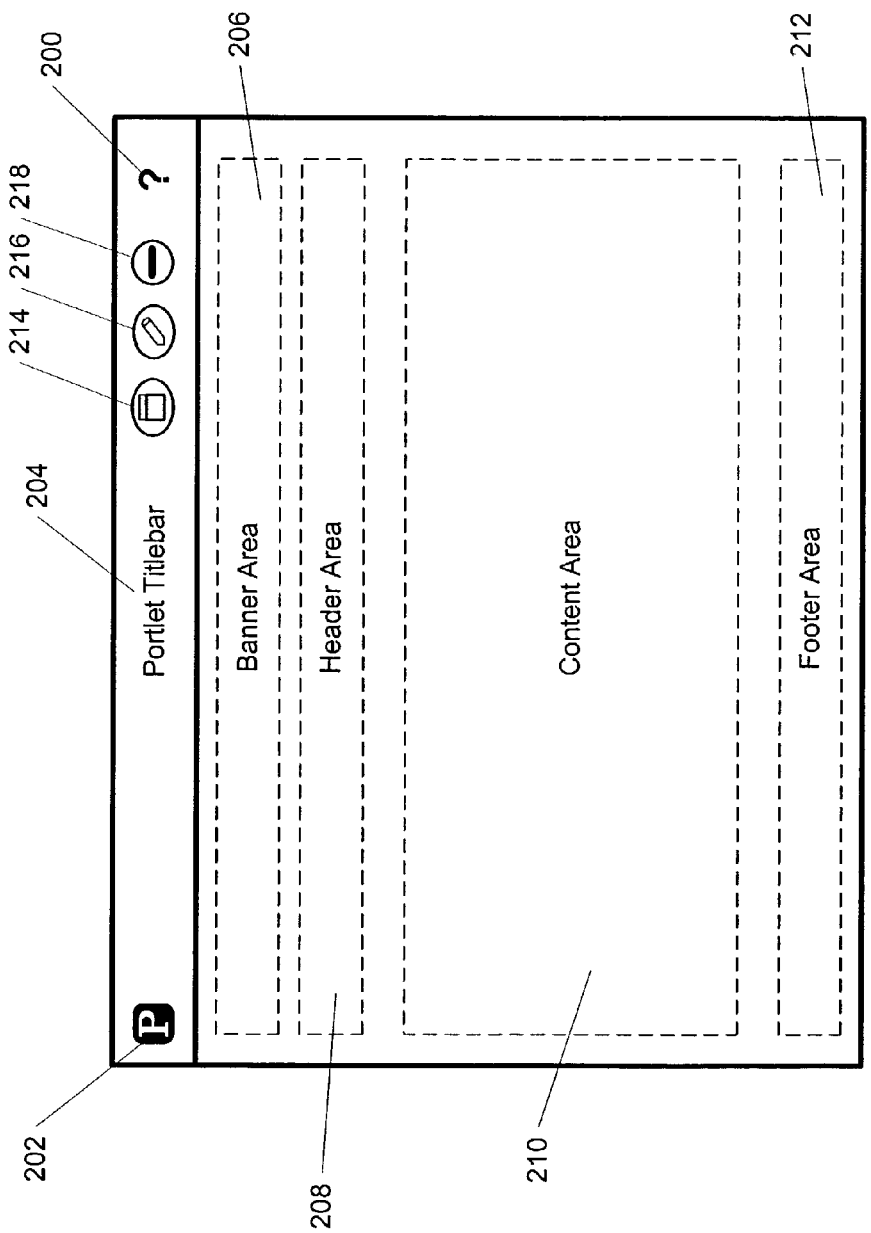
FIG. 2 is an exemplary diagram of a portlet GUI in accordance to one embodiment of the invention.

FIG. 2 is an exemplary diagram of a portlet GUI in accordance to one embodiment of the invention. In one embodiment by way of example, a portlet can have a title bar 204 and associated title bar icon 202. The title bar 204 can be used to identify the portlet or the portlet's content. A portlet can also have display areas: banner area 206, header area 208, content area 210, and footer area 212. The banner, header and footer areas can be used to display status messages, graphics or can be used to render user-selectable GUI controls such as buttons, drop down menus, etc. The content area 210 is where a portlet renders its content. Help icon 200 can be used to display help information when selected.

In one embodiment, a portal page such as in FIG. 1 can be described with a layout (hereinafter referred to as a "template"). A template can specify the location of elements on a portal page. A template can include one or more placeholders which define regions of the template wherein a portlet can render itself, or wherein other static or dynamic content can be rendered. A given placeholder can host more than one portlet. In such a case, the template area occupied by the placeholder could be shared amongst the portlets in a number of ways, including but not limited to stacking portlets on top of one another (not shown). In another embodiment, a template can be implemented as a Hypertext Markup Language (HTML) table and created with conventional HTML editors. Each cell in a such a table can represent a placeholder. Placeholders can be dynamically bound to portlet GUI's during portal page rendering. In one embodiment, this can be accomplished by inserting directives to initiate portlet execution, such as JSP tag library calls, in the HTML table cells representing placeholders.

Figure 3:
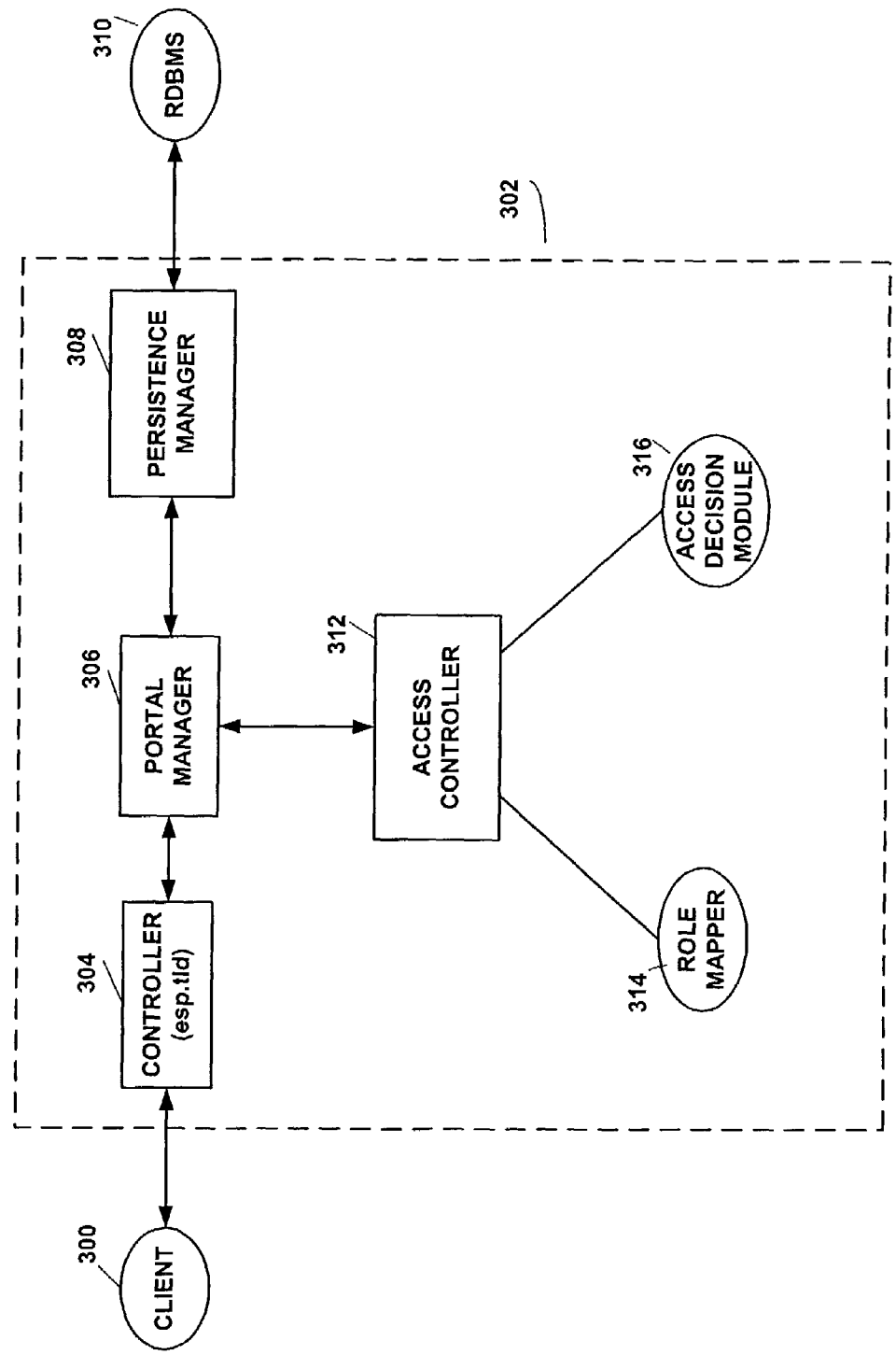
FIG. 3 is diagram of a system in accordance to one embodiment of the invention.

FIG. 3 is diagram of a system in accordance to one embodiment of the invention. Although this diagram depicts objects as functionally separate, such depiction is merely for illustrative purposes. It will be apparent to those skilled in the art that the objects portrayed in FIG. 3 can be arbitrarily combined or divided into separate software, firmware or hardware components. Furthermore, it will also be apparent to those skilled in the art that such objects, irregardless of how they are combined or divided, can execute on the same computer or can be arbitrarily distributed among different computers connected by a network.

In one embodiment, by way of illustration, client 300 can render a portal by delegating the work to a hierarchy of JSP's wherein one JSP renders parts of its GUI by invoking other JSP's. Client 300 can be a web browser, for example. However, client 300 may be any software, firmware or hardware capable of communicating with server 302. In one embodiment, server 302 can be any web server having a Java™ run-time environment and support for JSP, such as the BEA WebLogic Server™, available from BEA Systems, Inc. of San Jose, Calif.

JSP's separate GUI functionality on a client from application logic executing on a server, thereby enabling users to easily change a GUI without having to alter underlying application logic. Generally speaking, a JSP includes a page file that contains traditional HTML and Java™, but has a ".jsp" file name extension rather than ".html". The ".jsp" extension indicates to server 302 that the file contains embedded directives to invoke special JSP processing within server 302. For example, consider the following JSP page:

```
<%@page import="java.util.*" %>
<HTML>
<HEAD>
<TITLE>JSP Date Example</TITLE>
</HEAD>
<CENTER>
<H2>Today's Date is:</H2>
<%= new Date( ) %>
</CENTER>
</BODY>
</HTML>
```

Embedded in the HTML code above are statements expressly for processing by a JSP engine (not shown) in server 302. For example, the scriplet code fragment "new Date ( )" is delimited by the special symbols "<%=" and "%>". When the JSP page is invoked by client 300, it will be processed and executed on server 302 by the JSP engine, whereas the HTML code will be processed and executed on client 300. The above scriplet creates a new instance of the Date class on server 302 and returns the current date as a string to client 300, which is then displayed by client 300:

Today's Date is: Tues July 05 13:34:33 PDT 2002

In one embodiment, when client 300 invokes a JSP page, web server 302 compiles the page into a servlet and spawns it as a running process. A servlet is a process deployed in a web server. Any dynamic output of the servlet is sent back to client 300 as a response. Processing of JSP code within the web server may also result in the inclusion (and invocation) of other JSP files via the <jsp:include> or similar directive.

Figure 4:
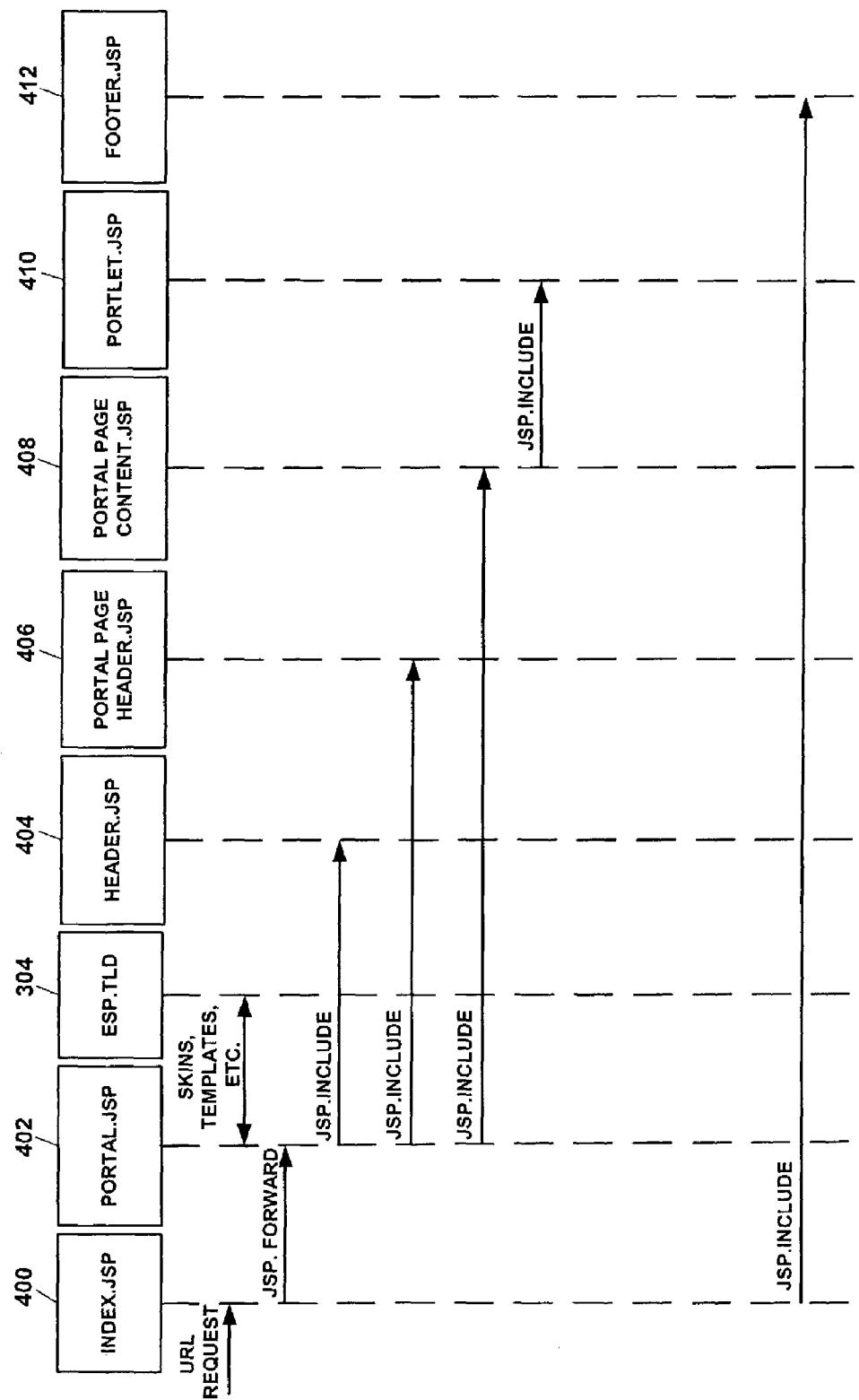
FIG. 4 is diagram of a portal rendering system and method in accordance to one embodiment of the invention.

FIG. 4 is diagram of a portal rendering system and method in accordance to one embodiment of the invention. In one embodiment by way of illustration, each box in the diagram having a file name therein represents a JSP page. The arrows beneath the boxes represent execution flow from one JSP page to another via JSP include directives. index.jsp 400 is the entry point for the portal web page. It forwards the web page request to the main portal JSP page, portal.jsp 402. portal.jsp 402 is responsible for rendering the portal and its contents. As such, it must acquire various information needed for this endeavor. In one embodiment, portal.jsp 402 retrieves such information via calls to a tag library esp.tld which can be part of controller 304. esp.tld includes JSP tags for communicating with portal manager 306. Portal manager 306 is responsible for retrieving and persisting information pertaining to portal "skins", portal templates and portlets. In one embodiment, the portal manager can be implemented as a stateless session Enterprise Java Bean™ (EJB). Persistence manager 308 is responsible for persisting this information and providing it to portal manager 306. Persistence manager 308 may utilize a relational database management system (RDMBS) 310.

In one embodiment, a skin can be a collection of files that includes a cascading style sheet and a directory of images that define the look and feel of a portal. Every button, banner, portlet header, background color, and font characteristic can be determined by a skin. In one embodiment, a portal can be associated with more than one user or portal group. A user group can be any arbitrary collection of users that is determined statically, or dynamically by evaluating rules that take into account information about a user and other information. A portal has a default skin that can be customized for a group. In this way, a group can define its own look and feel for a particular portal page. The group skin can be further customized to suit the needs of individual users. Skin information can be cached in server 302 so that it may be used by other JSP's invoked by portal.jsp during rendering of the portal page.

Another piece of information retrieved by portal.jsp 402 via esp.tld 304 is a template corresponding to each portal page. As with skins, a template can be customized. In one embodiment, customization of a template involves the layout or placement of portal elements (e.g., portlets, static data, dynamic data, header, footer, content, etc.) on the template. A template can be afforded an arbitrary number of levels of customization. In another embodiment, a template can have three levels of customization: global, group and user. An initial template is created for a portal page at the global level. This is the default template used for describing the portal page if there are no further customizations. Customizations at the group level supersede the global level template. Likewise, customizations at the user level take precedence over the group and global levels.

As part of retrieving the template, portal manager 306 binds portlets to template placeholders. In doing so, portal manager 306 utilizes access controller 312 to determine capabilities or permissions (e.g., whether the given portal user is entitled to execute, view or edit the portlet in question) based on one or more entitlements. An entitlement is a rule that grants or denies access to a resource capability. In one embodiment, a resource can be any resource available on a computer network, including but not limited to a portlet, a portlet GUI component, a portal page, portlet content, etc. In one embodiment, evaluation of an entitlement consists of dynamically associating roles with a user based on role rules that take into account information about the user, information about the user's communication session, or the current state of the system. For example:

(1) When all of these conditions apply, the user is a GoldMember:
Checking account balance>$5,000
Combined account balance>$50,000

In rule (1) above, a user is deemed a GoldMember if there is more than $5,000 in their checking account and they have more than $50,000 in their combined accounts. Certain portlets, for example, may only be for GoldMember users. By way of a non-limiting example, if only GoldMember users were entitled to view the portlet in question, the portlet would not be bound to a template for non-GoldMember users. Similarly, if the entitlement was for editing, then the portlet would be bound to the template and would be visible to a user, however only GoldMember users would be allowed to edit the portlet's contents. Access controller 312 directs role mapper 314 to determine which roles correspond to client 300. Access controller 312 then directs decision module 316 to determine whether or not access to a resource should be allowed based on entitlements corresponding to the roles.

The final piece of information portal.jsp 302 needs in order to render the portal is the currently selected portal page tab 100-104. This determines which portal page template to use initially, since each portal page is described by a template and each tab corresponds to a unique portal page. After obtaining this preliminary information, as shown in FIG. 4, portal.jsp 402 uses a JSP include directive to invoke header.jsp 404. header.jsp 404 renders a standard header which is the same for each page in the portal. The header could be a navigation pane, for example, allowing a user to jump to different areas of the portal. It could also provide a standard graphic design element to unify pages within the portal. Next, portal.jsp 402 invokes PortalPageHeader.jsp 406. PortalPageHeader.jsp 406 renders tabs 100-104 based on the number of portal page templates retrieved. Next, portal.jsp 402 invokes PortalPageContent.jsp 408 to render the selected portal page. A placeholder defines regions of the template wherein a portlet can display itself, or wherein other static or dynamic content can be rendered. In one embodiment, PortalPageContent.jsp 408 is responsible for rendering the page elements corresponding to each placeholder. If the placeholder hosts a portlet, PortalPageContent.jsp 408 invokes portlet.jsp 410.

Figure 5:
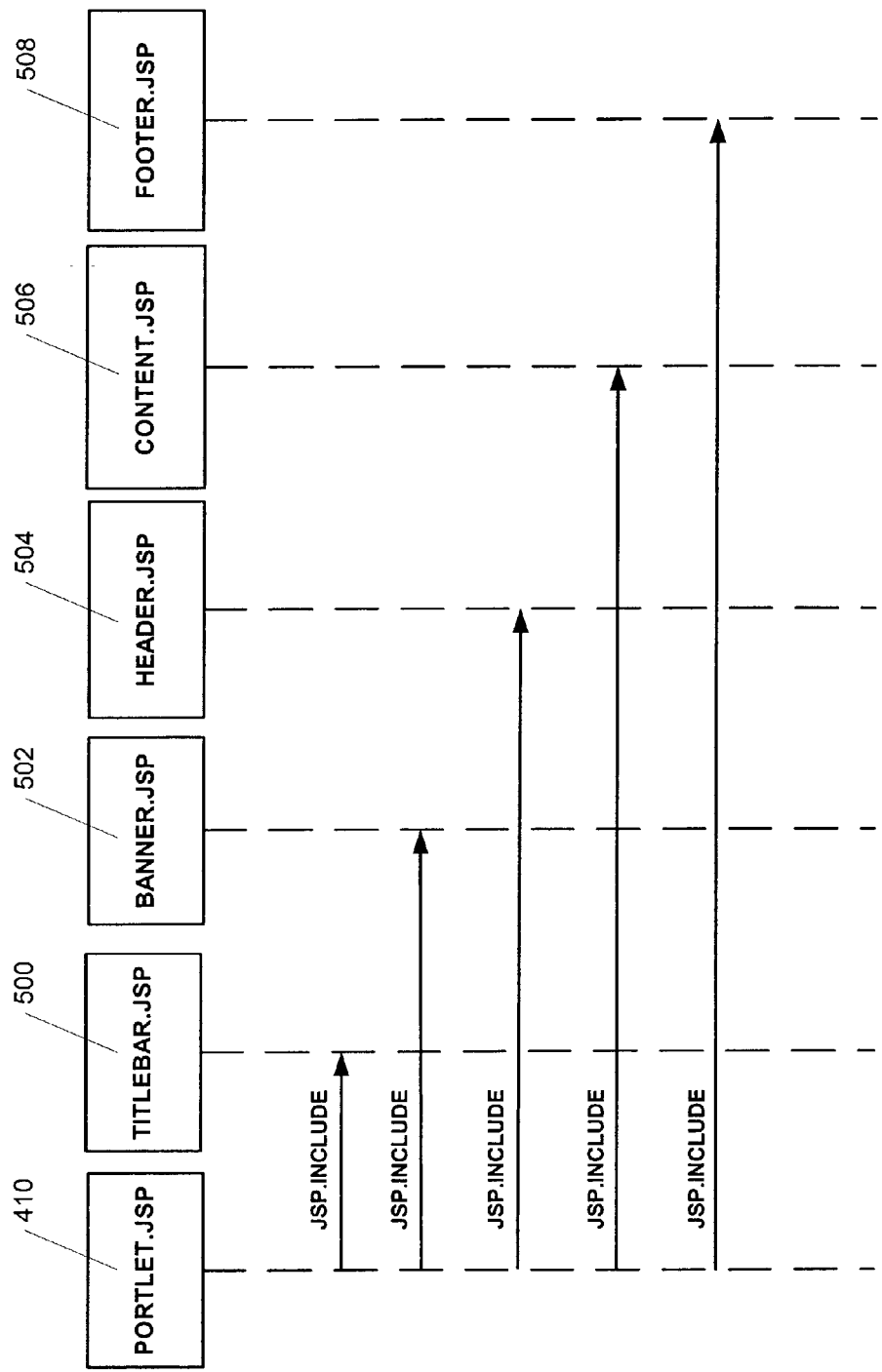
FIG. 5 is diagram of a portlet rendering system and method in accordance to one embodiment of the invention.

FIG. 5 is diagram of a portlet rendering system and method in accordance to one embodiment of the invention. In one embodiment by way of example, portlet.jsp 410 invokes Titlebar.jsp 500 which, in turn, renders the portlet's window title bar. The title bar might display icons that, when selected, allow a user to edit the portlet's contents 216, detach the portlet such that it occupies a window independent from the web browser's main window 214, or remove the portlet 218 (i.e., close its window). Titlebar.jsp 500 can access entitlement information via esp.tld 304 in deciding whether or not these icons are present or active. portlet.jsp 410 invokes Banner.jsp 502 to render a banner in a like manner to that of the portal page. portlet.jsp 410 invokes header.jsp 504 and footer.jsp 508 to render the header and footer portions of the portlet window. Portlet content generation (e.g., stock quotes) begins when portlet.jsp 410 invokes content.jsp 506 to initiate portlet execution (e.g., by making a JSP tag library call).

FIG. 6 is an XML portlet document in accordance to one embodiment of the invention. XML is a standard markup language that combines a generic syntax with human-readable tags to represent any kind of data. In one embodiment, there is no XML "document" per se. Rather, the XML description of portlet attributes can exist as a one or more streams of bytes or data sent between applications, objects and devices. In another embodiment, an XML document can exist as a physical file in a computer file system. Generally speaking, an XML document is self-descriptive and consists of one or more elements. An element has content or information which is delimited by a start tag and an end tag. Start tags begin with "<" and end with ">". However, end tags begin with "</" and end with ">". For example:

```
<company>
    BEA Systems, Inc.
</company>
```

In this example, the company element has a start tag "<company>", an end tag "</company>" and the content "BEA Systems, Inc." An element can also be empty. In this case, the element consists of a single tag that begins with "<" and ends with "/>".

XML does not have a fixed set of tags. Rather, each application can define its own tags with their own meaning. In one embodiment by way of illustration, Table 1 enumerates tags that can be used to describe portlet attributes. Although some tag names indicate that their content consists of a uniform resource locator (URL), in another embodiment the content could be any identifier that specifies the location of a resource on a network such as the Internet. A Boolean or flag value indicates a state of true or false. A string is a sequence of characters.

TABLE 1

Portlet XML Tag Definitions

| XML Tag | Data Type | Description |
|---|---|---|
| Portlet-name | String having up to 254 characters. | A string that serves to identify the portlet JSP. |
| Description | String having up to 254 characters. | This is a simple description of the portlet's capabilities. |
| weblflow-filename | String. | The name of a file which contains webflow information. This information can be used to drive web page navigation processing on a server. |
| content-url | String. | The URL to the content area JSP. |
| Header-url | String. | The URL to the header area JSP. |
| alternate-header-url | String. | The URL to the header that should be used by default when the page is maximized. |
| Footer-url | String. | The URL to the footer area JSP. |
| alternate-footer-url | String. | The URL to the footer used for maximized state. |
| titlebar-url | String. | The URL to the default title bar JSP. |
| Banner-url | String. | The URL to the banner are JSP. |
| editable | Boolean. | Whether the portlet content will be editable by a user. |
| Edit-url | String. | The URL to a portlet editor JSP that is invoked if the edit icon 216 is selected. |
| helpable | Boolean. | Whether there is online help available for this portlet. |
| help-url | String. | The URL to the portlet help JSP that is invoked if the help icon 200 is selected. |
| icon-url | String. | The URL to the image for titlebar icon 202. |
| minimizable | Boolean. | Whether this portlet can be minimized by a user. |
| maximizable | Boolean. | Whether this portlet can be maximized by a user. |
| maximize-url | String. | The URL to the maximized body JSP. |
| mandatory | Boolean. | Whether this portlet must can be removed by a user (icon 218). |
| moveable | Boolean. | Whether or not a user can move the portlet when customizing a portal page. |
| floatable | Boolean. | Whether this portlet can be opened as a floating window (icon 214). |
| Default-minimized | Boolean. | Whether this portlet appears minimized by default. |
| login-required | Boolean. | Whether this portlet requires a user to login prior to having access to the portlet. |

FIG. 7 is an XSD in accordance to one embodiment of the invention. In one embodiment, XML meta data for portlets is represented in accordance with a particular schema. By way of illustration, an XSD can be used to validate the data in an XML document by defining data type constraints for each element of data in an XML document. Table 1 summarizes this information in the "Data Type" column. XSD elements are defined in XML. Elements are declared using the "xsd: element" tag which has name and data type attributes corresponding to an element in an XML document. For example, the following XSD code fragment declares a "portlet" element as a sequence of other elements, namely "portlet-name" and "description":

```
<xsd: element name = "portlet">
    <xsd: complexType>
        <xsd: sequence>
            <xsd: element name="portlet-name"
                type="string254"/>
            <xsd: element name="description"
                type="string254"/>
        </xsd: sequence>
    </xsd: complexType>
</xsd: element>
```

This fragment could be used to validate an XML document that described a portlet, for example. Both portlet-name and description have a data type of string254 and since they occur in a sequence, an XML document being validated by this code fragment must also have portlet-name and description in the same order and with the same data types.

One embodiment may be implemented using a conventional general purpose or a specialized digital computer or microprocessor programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A method for representing portlet configuration information in an extensible markup language (XML document, comprising:

providing an extensible markup language document that describes portlet configuration information, said portlet configuration information containing metadata for describing how the portlet's graphical user interface is rendered and to what extent a user can interact with said interface, wherein the document includes:
  a name element including a name tag for defining the name of the portlet;
  a description element including a description tag for describing the portlet; and
  a content resource element including a content tag, the content resource element describing a resource used to generate the portlet;

validating the portlet configuration information in the document by using an XML schema definition that defines data type constraints for each element in the document;

initiating a request to generate a portal by invoking the resource described in the document; compiling the resource to spawn a hierarchy of interdependent rendering processes; and generating the portal by executing the hierarchy of interdependent rendering processes wherein generating the portal includes reading a portal skin that defines a look and feel of the portal including one or more of: button, banner, portlet header, back ground color and font characteristic of said portal, said portal skin customized to at least one of: individual user and group;

wherein executing the hierarchy of interdependent rendering processes includes executing at least one interdependent rendering process that renders parts of its graphical user interface by invoking other interdependent rendering processes in said hierarchy such that the portlet's contents are editable by detaching the portlet whereby the portlet occupies a window independent from a browser's main window; and wherein said document enables nonproprietary tools to manipulate and render the portlet in said portal by representing said portlet configuration information in a standard way.

2. The method of claim 1 wherein the document further comprises:
a header resource element including a header tag.

3. The method of claim 1 wherein the document further comprises:
an alternate header resource element including an alternate header tag.

4. The method of claim 1 wherein the document further comprises:
a footer resource element including a footer tag.

5. The method of claim 1 wherein the document further comprises:
an alternate footer resource element including an alternate footer tag.

6. The method of claim 1 wherein the document further comprises:
a title bar resource element including a title bar tag.

7. The method of claim 1 wherein the document further comprises:
a banner resource element including a banner tag.

8. The method of claim 1 wherein the document further comprises:
an editable element including an editable tag; and
an editor resource element including an editor tag.

9. The method of claim 1 wherein the document further comprises:
a helpable element including a helpable tag; and
a help resource element including a help tag.

10. The method of claim 1 wherein the document further comprises:
an icon resource element including an icon tag.

11. The method of claim 1 wherein the document further comprises:
a minimizable element including a minimizable tag.

12. The method of claim 1 wherein the document further comprises:
a maximizable element including a maximizable tag.

13. The method of claim 1 wherein the document further comprises:
a maximize element including a maximize tag.

14. The method of claim 1 wherein the document further comprises:
a mandatory element including a mandatory tag.

15. The method of claim 1 wherein the document further comprises:
a moveable element including a movable tag.

16. The method of claim 1 wherein the document further comprises:
a floatable element including a floatable tag.

17. The method of claim 1 wherein the document further comprises:
a default-minimized element including a default-minimized tag.

18. The method of claim 1 wherein the document further comprises:
a login-required tag and a login-required element.

19. The method of claim 1 wherein the document further comprises:
a webflow-filename element including a webflow-filename tag.

20. The method of claim 1 wherein the document further comprises:
state information.

21. A system for representing portlet configuration information as an extensible markup language (XML document, comprising:
a server for rendering portals by performing a hierarchy of interdependent rendering processes;
a portal rendered by the server, the portal having a portlet for managing a separate graphical user interface within the portal's graphical user interface wherein the portlet includes portlet configuration information;
an extensible markup language document stored in a computer readable
storage medium for representing the portlet configuration information, the document including identification information for identifying the portlet and further including rendering information for describing one or more resources that comprise the hierarchy of interdependent rendering processes; and
a client for initiating a request to render the portal by invoking the one or more resources described in the extensible markup language document;
a portal skin that defines the look and feel of said portal including one or more of: button, banner, portlet header, background color and font characteristic of said portal, wherein said portal skin is customized to at least one of: individual user and group; and an extensible markup language schema for validating the data in the XML document by checking data type constraints for each element of data in the XML document;

wherein the server receives the request to render the portal from the client, compiles the one or more resources to spawn the hierarchy of interdependent rendering processes and generates the portal by executing the interdependent rendering processes wherein generating the portal includes reading the portal skin;

wherein executing the hierarchy of interdependent rendering processes includes executing at least one interdependent rendering process that renders parts of its graphical user interface by invoking other interdependent rendering processes in said hierarchy such that the portlet's contents are editable by detaching the portlet whereby the portlet occupies a window independent from a browser's main window; and wherein said document enables nonproprietary tools to manipulate the render the portlet in said portal by representing said portlet configuration information in a standard way.

22. The system of claim 21 wherein the interdependent rendering processes further include:

a portal manager for retrieving and persisting information pertaining to portal skins, portal templates and portlets;

a controller for enabling communication with the portal manager; and a persistence manager for enabling the portal manager to persist the information;

wherein the portal and its contents are rendered by calling the portal manager, the controller and the persistence manager.

23. The system of claim 21 wherein the one or more resources are implemented as Java Server Pages compiled into servlets and spawned as running processes deployed on the server.

24. The system of claim 21 further comprising:

an extensible markup language schema for validating the data in the XML document by defining data type constraints for each element of data in the XML document.

25. A computer readable storage medium having instructions stored thereon, which when executed by one or more processors cause a system to:

provide an extensible markup language document that describes portlet configuration information, said portlet configuration information containing metadata for describing how the portlet's graphical user interface is rendered and to what extent a user can interact with said interface, wherein the document includes:

a name element including a name tag for defining the name of the portlet;

a description element including a description tag for describing the portlet; and a content resource element including a content tag, the content resource element describing a resource used to generate the portlet;

validate the portlet configuration information in the document by using an XML schema definition that checks data type constraints for each element in the document;

initiate a request to generate a portal by invoking the resource described in the document;

compile the resource to spawn a hierarchy of interdependent rendering processes; and generate the portal by executing the hierarchy of interdependent rendering processes wherein generating the portal includes reading a portal skin that defines a look and feel of the portal including one or more of: button, banner, portlet header, background color and font characteristic of said portal, said portal skin customized to at least one of: individual user and group;

wherein executing the hierarchy of interdependent rendering processes includes executing at least one interdependent rendering process that renders parts of its graphical user interface by invoking other interdependent rendering processes in said hierarchy such that the portlet's contents are editable by detaching the portlet whereby the portlet occupies a window independent from a browser's main window; and wherein said document enables nonproprietary tools to manipulate and render the portlet in said portal by representing said portlet configuration information in a standard way.

* * * * *

UNITED STATES PATENT AND TRADEMARK OFFICE
CERTIFICATE OF CORRECTION

PATENT NO. : 7,367,014 B2
APPLICATION NO. : 10/279449
DATED : April 29, 2008
INVENTOR(S) : Griffin It is certified that error appears in the above-identified patent and that said Letters Patent is hereby corrected as shown below:

Title page 3, in column 1, under "U.S. Patent Documents", line 42, after "8/2005" delete "Osborne" and insert -- Osborne II, --, therefor.

Title page 4, in column 1, under "Other Publications", line 26, delete "Sevices"," and insert -- Services", --, therefor.

Title page 4, in column 1, under "Other Publications", line 63–64, after "and Reliable" delete ", and Reliable".

Title page 4, in column 1, under "Other Publications", line 65, delete "System" and insert -- Systems --, therefor.

Title page 4, in column 2, under "Other Publications", line 54, delete "Technolgies," and insert -- Technologies, --, therefor.

Drawings
On sheet 7 of 7, in Figure 7, line 9, delete "atttributeformDefault" and insert -- attributeformDefault --, therefor.

On sheet 7 of 7, in Figure 7, line 14, delete "compexType>" and insert -- complexType> --, therefor.

In column 1, line 43, delete "2002;" and insert -- 2002. --, therefor.

In column 3, line 46, after "in" delete "a".

In column 7, line 13, delete "weblflow" and insert -- webflow --, therefor.

In column 7, line 27, delete "are" and insert -- area --, therefor.

In column 7, line 43, after "portlet" delete "must".

In column 9, line 3, in claim 1, after "XML" insert -- ) --.

In column 9, line 31, in claim 1, delete "back ground" and insert -- background --, therefor.

In column 10, line 46, in claim 21, after "XML" insert -- ) --.

Signed and Sealed this

Ninth Day of February, 2010

David J. Kappos
*Director of the United States Patent and Trademark Office*